United States Patent [19]

Biró et al.

[11] Patent Number: 5,716,164
[45] Date of Patent: Feb. 10, 1998

[54] PROCESS FOR THE LOCAL TREATMENT OF SOIL IN PARTICULAR FOR EXAMINATION AND CLEANING OF CONTAMINATED SOIL

[75] Inventors: Emöke Bíró, Székesfehervár; Zoltán Székvölgyi, Veszprém; Ottó Horváth; Tibor Gábris, both of Várpalota, all of Hungary

[73] Assignee: Foldtani Kutato Es Furo Ket, Varpalota, Hungary

[21] Appl. No.: 252,594

[22] Filed: Jun. 1, 1994

Related U.S. Application Data

[63] Continuation-in-part of PCT/HU92/00051, Dec. 1, 1992.

[51] Int. Cl.[6] .............................. B09B 3/00; E62D 3/00
[52] U.S. Cl. ................ 405/128; 405/129; 588/249; 588/259
[58] Field of Search .................. 405/128, 129; 588/249; 166/50, 366, 367

[56] References Cited

U.S. PATENT DOCUMENTS

| | | | |
|---|---|---|---|
| 4,176,985 | 12/1979 | Cherrington | 175/61 X |
| 4,249,777 | 2/1981 | Morrell et al. | 166/50 X |
| 4,401,569 | 8/1983 | Jhaveri et al. | 405/128 X |
| 4,832,122 | 5/1989 | Corey et al. | 405/128 X |
| 4,834,193 | 5/1989 | Leitko et al. | 175/61 X |
| 4,849,360 | 7/1989 | Norris et al. | 405/128 X |
| 4,850,745 | 7/1989 | Hater et al. | 405/128 X |
| 4,875,805 | 10/1989 | Gross | 405/128 |
| 5,076,727 | 12/1991 | Johnson et al. | 405/128 |

FOREIGN PATENT DOCUMENTS

| | | |
|---|---|---|
| 0170862 | 6/1985 | European Pat. Off. ........ 405/128 |
| 0228626 | 12/1986 | European Pat. Off. . |
| 3838850 | 6/1990 | Germany . |
| 4008270 | 9/1991 | Germany . |

Primary Examiner—Dennis L. Taylor
Attorney, Agent, or Firm—Ladas & Parry

[57] ABSTRACT

A process for the treatment of soil in situ involving examination and cleaning of contaminated soil. Treating medium and/or any other material for treating the contamination is introduced into the soil intended to be treated. The process involves the use of oblique angled connecting pipes which are connected to a perforated pipe-system fitting to the dominant position of the contaminated layer or the layer intended to be treated. One branch of the pipe system collects the contaminated liquid and/or contaminated soil water and brings it to the earth's surface. The other branch of the system delivers treating medium to the contaminated soil. Optionally, the contaminated liquid or contaminated soil-water can be cleaned and reintroduced into the same branch of the pipe system into which the treating medium is introduced.

9 Claims, 2 Drawing Sheets

PROCESS FOR THE LOCAL TREATMENT OF SOIL IN PARTICULAR FOR EXAMINATION AND CLEANING OF CONTAMINATED SOIL

This is a continuation-in-part of copending application International Application PCT/HU92/00051 filed on Dec. 1, 1992 and which designated the U.S.

FIELD OF THE INVENTION

The invention relates to a process for the local treatment of soils in particular examining and cleaning of contaminated soil. The process according to the invention is primarily recommended for soils that are contaminated with chemicals or crude oil resp. derivatives of oil. This process can be used where the contaminated soil is several meters below the surface soil. Soil contaminations can occur from industrial plants, fuel bases, oil (petroleum) refineries and in environments of military objects. Soil contamination can also result from traffic accidents and vehicular traffic. Soil contamination can be dangerous and can directly or indirectly affect the food supply. It is of utmost importance to eliminate contamination using efficient methods that have minimal detrimental effects.

Local treatment of soil is within the scope of this invention. Local treatment of soil can be carried out with or without simultaneous cleaning. Although the applicants are of the opinion that the process according to the invention will be mostly for soil cleaning it goes without saying that this does not mean that the invention is limited to the use of cleaning soil. Applicants distinguish two versions of possible methods, namely exchange of soil and locally performed cleaning. One aspect of applicants' invention is directed to local soil cleaning. The process according to the invention will be used mostly for soil cleaning, however, the invention is not limited to cleaning soil.

BACKGROUND OF THE INVENTION

In certain known processes of soil cleaning, vertical bores are drilled in the contaminated layer, and depending on the nature of the contamination, detergents with cleaning effects, bacterial cultures or air are introduced into the bores to be introduced into the contaminated layer. Efficiency of the method can be modified by changing the frequency of the arrangement of bores and by increasing the permeability of the contaminated layer by using explosives. However, increments of efficiency effected by these changes is rather limited.

"Wasser Luft, Boden" (1990. No. 11-12, Page 94-95) relates to a method for in-situ rehabilitation of soils having been contaminated with volatile chlorinated hydrocarbons. When operating said method, soil-air is sucked through the vertical bores. (For the sake of order it should be mentioned that from the point of view of interpretation of applicants' invention the term liquid means every kind of fluid, including gaseous media.) Another example found in the aforementioned periodical (Wasser Luft, Boden, 1990. No. 11-12 pages 90-91), relates to soil-washing with high pressure.

In the process disclosed in European Patent A, 0 170 862 after having exchanged soil—representing the essence of the invention—into the not cleaned part of the contaminated soil, cleaning liquid is introduced into the contaminated soil through vertical bores. Suction is introduced through one or more vertical bores situated away from the bores into which the soil cleaning liquid is introduced. These methods are unsuitable for the uniform treatment of contamination of a larger volume.

Other known solutions including the above mentioned ones, have several disadvantages. One of the disadvantages is that only a single type of soil cleaning can be realized. It is impossible to apply simultaneously or in parallel, biological, physical and chemical methods on a given place but at different depths.

Another disadvantage of the prior art methods is that due to the vertical bore, the method cannot be performed on several places. It becomes quite obvious that it is impossible to penetrate—using vertical bores—into soil layer lying under buildings, beds of water streams, slopes and the like.

Three states of oily soil contaminations of a chemical nature can be distinguished; namely the bound form, the released form and the free form. In the case of a contamination appearing in bound form, biological cleaning seems to be the most expedient. Chemical methods seem to be the most efficient in treating soil contamination being present in a released state. Soil contaminations occurring in a free form may be cleaned with the highest efficiency by using physical methods.

SUMMARY OF THE INVENTION

The aim of the invention is to provide for a solution which can be used generally, while different treating and/or cleaning can be applied in combination. The process according to the invention reaches this goal primarily due to the arrangement in which a perforated pipe system, connected to pipes laid in oriented drilled borings, occupy a position being in compliance with the dominant direction of the contaminated layer. The pipes may collect both the contaminated liquid and contaminated soil water and deliver them to the earth's surface. The different treating and cleaning media may be introduced into the pipes to reach the designated contaminated layer.

The mentioned dominant direction is the spatial position of the majority of the relevant soil layer. For example, a layer can be considered as a horizontal layer if the majority of its mass is lying in the horizontal zone, although single sections may slope. In the case of the aforementioned horizontal layer, the dominant direction would be horizontal, and the pipe system is considered to be horizontal. It goes without saying that the pipe system is connected to oblique angled pipes, thus staying in connection with surface equipment, for example, for connection to a pump.

The pipe system is installed in bores having been formed by oriented boring technology, (boring technology is known in the art) without demolition of the soil or the structures situated above the contamination. After the bore is drilled, the drilling machine draws the single sections of the pipe system into the bored duct, progressing in a direction being opposite to the direction of drilling. In one branch of the pipe system, arranged in the bores and consisting of perforated pipes, treating media is introduced. The other branch of the pipe system carries the liquid including the contaminated material onto the surface. The pipe system is designed so as to enclose the full mass of the contamination. The shapes and frequency of the arrangement of perforations can be varied e.g. chosen in compliance with local conditions. From the point of view of the fluid technics the pipe system may consist also of a plurality of streaming circuits in which different processes may take place simultaneously. The pipe system may be installed at a depth to meters in general without causing problems.

All the pipes including the connecting pipes can be made of known synthetic materials. Pipes with a diameter of up to 200 mm can be used.

In European Patent EP, A1, 0 228 626 (page 8, line 34) a perforated pipe system sunk into the soil is provided for the removal of contaminated liquid, however introduction of the cleaning medium takes place by sprinkling and spraying guided from the surface (page 8, lines 35–45). Efficiency of introduction of cleaning medium from the surface by sprinkling and spraying is inferior to applicants solution, as the oriented introduction by means of a pipe system comprising perforated pipes is far more efficient as it encloses the full mass of contamination.

In the Patent DE, A1, 3 838 850, a system is specified which is placed under the deponies prior to filling and which is suitable for the treating of later arising contamination. The drainage piping arranged under the deponia collects and delivers the contamination carrying liquid and discharges it on the surface. Treating medium, optionally moistening, is sprayed, or sprinkled on the upper surface of the deponia, (claim 1.) A possible upper pipe system is also mentioned, but in connection with claim 1. Introduction of treating media guided from above in an irregular stream is characterized therein.

All of these prior art methods differ from the instant invention in respect of two fundamental characteristics. Firstly, the pipe systems have to be established preliminary, as a consequence, the systems are unsuitable for the removal of any contamination arising in an unforeseen place. Secondly, the importance of the effect to be achieved by the oriented introduction of the treating medium into the contaminated layer has not been recognized. The problem can be solved by the pipe system according to the invention consisting of perforated pipes and enclosing the full mass of the contamination. The method according to the European Patent EP, A1, 0 170 862 is suitable for treating contaminations arising in unforeseen places, but it does not give efficient means for enclosing the full volume of contamination, as the vertical wells established for the introduction of treating media and removal of contamination, even if arranged densely, are by no means equivalent to the pipe system assembled from perforated pipes in accordance with applicants' invention.

A further fundamental difference is that by using vertical wells, contamination under buildings cannot be treated without demolishing already existing buildings. In contrast, operating, the pipe system comprising perforated pipes connected to pipes in oblique bores can take place without demolishing soil and buildings.

The apparatus according to the invention, comprising perforated pipes and the connected charging and discharging pipes, differs from other solutions, like the drainage system according to DE, A1, 383, 850, in so far as after formation of contamination, if soil cleaning is required, the drainage system can be established at any place.

In the method according to the invention, contamination of the contaminated layer and/or the layer intended to be cleaned can be examined directly or indirectly. Examination can be carried out continuously or discontinuously. One possible method of direct examination lies in that vertical observing wells are drilled independently of the pipe system, while the signals of the sensors having been built in the wells are processed on the surface. Conditions prevailing in the examined layer are tested in laboratories by analyzing the samples. It becomes possible to perform indirect examinations in so far as contaminated soil water having been collected in the pipe system and delivered to the surface is subjected to analysis. From the result of the analysis soil contamination can be determined. Another possible method for testing contamination involves installing a carotage cable into the pipe system or to a part thereof and by means of a measuring unit connected to the carotage cable hole, geophysical measuring is carried out. Not only can a carotage probe be installed into the oblique angled and horizontal pipe system but any other probe or instrument can also be installed into the pipe system. By means of said units physical, chemical and biological change can be registered in the examined layer. Simultaneously, stability of the layer can also be checked. By means of the oblique angled and horizontal pipe system core-samples are available. Obtaining core-samples is not limited to obtaining core-samples from the vertical bores. By the analysis thereof in laboratories more accurate information will be available.

Introduction and sucking back of the cleaning medium take place in the necessary depth. The process can be controlled so that the liquid does not spread into other layers. The contaminated soil-water having been brought onto the surface, may be cleaned, while the contamination itself and optionally the contaminating liquid can be led to a closed safe place meeting ecological and environment requirements. Generally it seems to be expedient to recirculate the cleaned soil-water into the aforementioned contaminated layer.

After having cleaned the contaminated layer, the installed pipe system can be utilized as an observing and/or monitoring system. The system is suitable for using biological cultures to clean the soil. If cultures are applied in the proximity of soil-water and processes tend to occupy an undesirable direction (excess proliferation of bacteria) by means of a parallel established system according to the invention immediate intervention to hinder the undesired biological function of bacteria for example, by freezing, or changing the pH can take place.

Accordingly, the essential feature of the process according to the invention lies in the installation of oblique angled connecting pipes and a perforated pipe system connected thereto, fitting to the dominant position of the contaminated layer resp. to the layer intended to be treated, so occupying the horizontal position, consisting of continuous pipes or streaming circuits. In one branch contaminated liquid or contaminated soil-water is collected and delivered to the surface, while in the other branch treating means and/or cleaning means and/or fresh water will be introduced into the contaminated layer.

To monitor the performance of the process according to the invention, contaminated soil-water having been delivered to the surface is analyzed continuously or discontinuously.

If it seems to be expedient to do so, the contaminated layer e.g. the layer intended to be treated is examined independently of the pipe system by means of an observing well. A preferred embodiment of the process according to the invention lies in, that the treated e.g. contaminated layer is examined by means of a catorage cable installed into at least a part of the pipe system, or by using a sensor and/or measuring element connected to a surfacial measuring unit.

In accordance with the invention it becomes possible to clean the contaminated soil-water delivered onto the surface in situ, whereafter clean water is recycled into the contaminated layer.

In the course of the process according to the invention bacteria-culture and/or chemicals may be used as the cleaning medium.

The process according to the invention will be detailed in connection with a preferred embodiment making reference to the drawings enclosed.

DETAILED DESCRIPTION OF TEE PREFERRED EMBODIMENT

Figure 1:
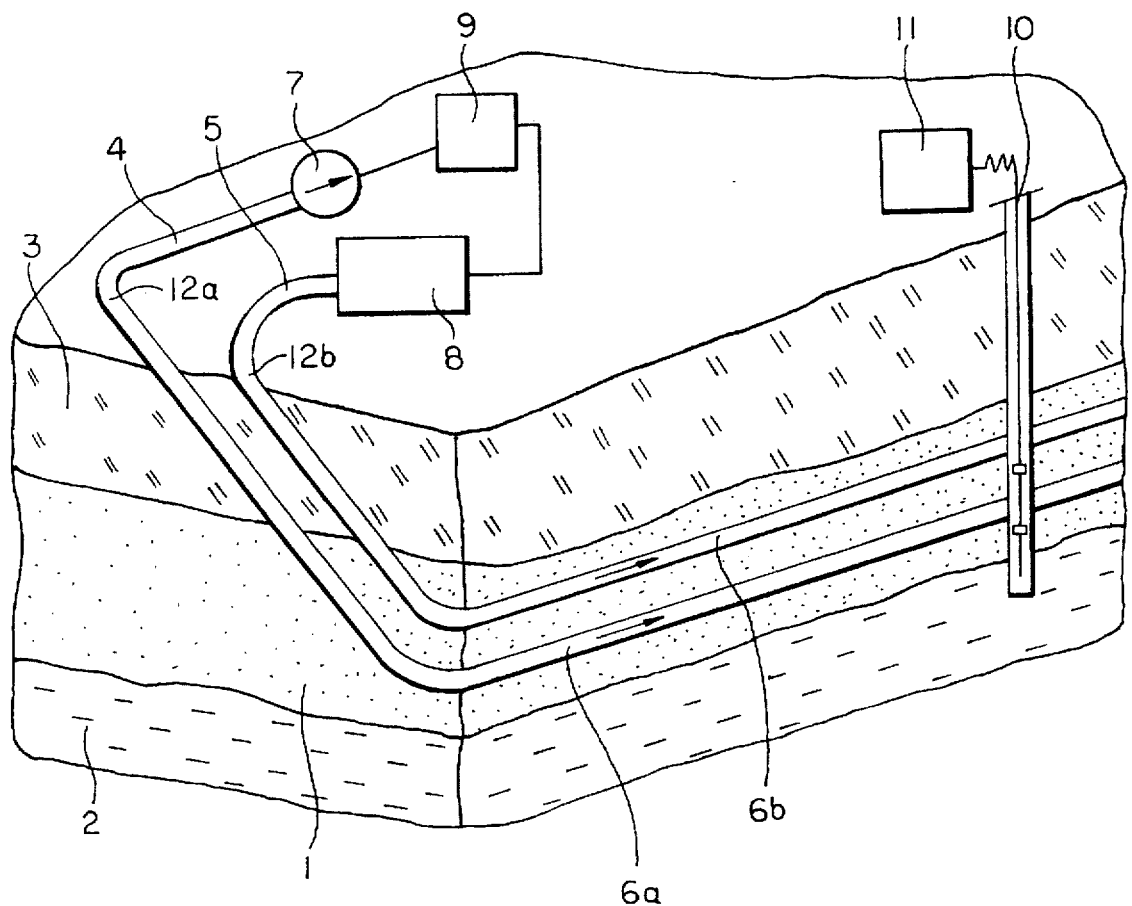
FIG. 1. illustrates the pipe system consisting of the oblique angled charging pipes and the thereto connected perforated-pipes, as well as pumping, measuring and controlling devices.

FIG. 1. shows a cross-section view of the soil illustrating the necessary means needed for the process according to the invention. In the case illustrated here the contaminated layer 1 lies below the top cover layer 3 and below the layer 1, the impermeable layer 2 is found. The contaminated layer 1 is a permeable layer that contains the contamination. In order to eliminate contamination, the pipe system 6a, and 6b, being composed of perforated pipes, is established without demolishing the soil by using one of the known methods of laying pipes in drilled horizontal bores. From the embodiment serving as an example illustrated here, it becomes obvious that the dominant position of the contaminated layer 1 intended to be cleaned is horizontal, accordingly the pipe system 6a, and 6b serving directly for cleaning also occupies a horizontal position. A complete lay out of the pipe system 6a and 6b is not detailed in the drawing, however, for the sake of order, it should be mentioned, that the system may be composed of several streaming circuits, these streaming circuits may be interconnected, but it is also possible to form individual circuits.

Figure 2:
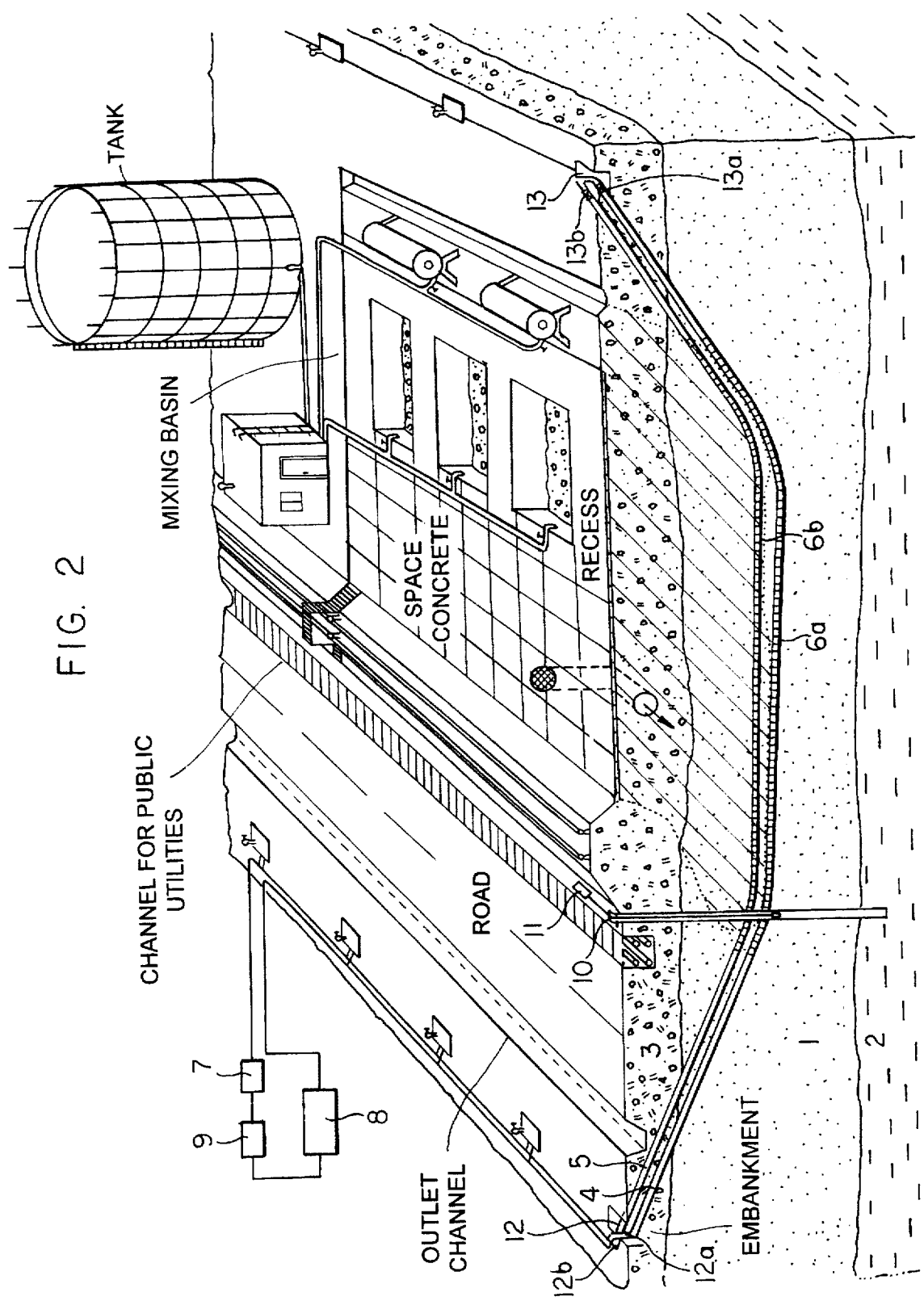
FIG. 2 illustrates the process of laying the pipe system, as illustrated in FIG. 1., into the contaminated soil with special consideration of soil contaminations to be found below already existing establishments.

The pipe system 6a illustrated here is connected via the oblique angled connecting pipe 4 to the pump 7, while the oblique angled connecting pipe 5 connects to the tank 8. Pump 7 delivers the contaminated soil-water from the contaminated layer 1 to the reactor 9; thereafter the cleaned soil-water arrives at the tank 8, wherefrom it is discharged through the connecting pipe 5 into the pipe system 6b being composed of perforated pipes. The system according to the invention is laid into the contaminated soil layers without demolishing the soil. FIG. 2. illustrates the method enabling laying of the system below already existing establishments. Contaminated soil is reached by means of known wireless controlled drilling technology. The drilling machine begins drilling for arranging the pipe system, consisting of the perforated pipes 6a and 6b outside the establishment, at the place 12, without demolishing the soil; it emerges on the surface similarly outside the establishment at the place 13, after having crossed the contaminated soil mass. At the place of appearance on the surface (point 13) the drilling machine is connected to the pipeline, consisting of the charging and discharging pipes 4,5 and the perforated pipes 6a, 6b. Starting from the point 13 pipe sections 4 and 6a, resp. 5, and 6b are pulled back one by one in direction of point 12; in such a manner the pipe system 6a and 6b and the charge resp. discharge pipes 4 and 5 are laid into the soil. At point 13, the pipes are closed. Accordingly, the treating medium can leave but at the required place and the contaminated liquid can enter into the perforated pipes at the required place. The charging and discharging pipes 4 and 5 are not perforated. The number of bores is based on the volume of the contamination mass. As seen in FIGS. 1 and 2 when there is only one charge and discharge, only two bores are drilled.

With the embodiment serving here as an example, an observing well 10 is built independently of the pipe system 6a and 6b. A probe, carotage cable or other sensing means are installed into the well; signals coming from these are evaluated by means of observing organ 11. From continuous or discontinuous examinations, one can monitor the cleaning process of the contaminated layer 1. Examination may be carried out in so far as catorage cable is built into a section of the pipe system 6a, 6b or into a section thereof. The signals thereof are processed on the surface with means known in the art in order to be able to follow and observe changes in contamination of the soil. Another embodiment of the invention is a pipe system through which bacterial culture or any other chemical detergent can be introduced into the contaminated layer 1. The pipe system illustrated here can be used for introducing bacterial culture or chemical cleaning media and for delivering clean water or cleaned soil-water back to the soil. If the contamination is in a liquid state and it fills a predetermined space where the pipe system 6a and 6b have been installed, from this space the liquid contamination can be delivered directly onto the surface.

Once one has knowledge of the in-situ conditions, the most efficient method can be chosen and the most advantageous chemical and biological composition and concentrations thereof can be selected. The hole geophysics, to be realized by the horizontal pipe system, can be accurately defined and lay boundaries laying next to the surface can be easily determined.

From the examples enumerated, it is clear that by performing the process according to the invention physical, chemical and biological soil cleaning can be conducted separately and/or simultaneously. The choice depends on the geological situation and type of contamination.

On the basis of the experiments carried out with the process according to the invention and the results obtained, it can be unambiguously stated that by means of the horizontal pipe system efficiency is an order of magnitude better in comparison to earlier solutions for the same purpose.

In the process according to the invention, the costs may be reduced in certain cases to e.g. one-fifth or one tenth of the costs of known processes.

The pipe system applied in course of the process according to the invention serves several purposes in connection with subsurfacial soil layers. Examples of how the invention can be used to treat soil will now be described. One method involves introducing liquid nitrogen in the pipe system, allowing the liquid nitrogen to circulate in the liquid in the soil. The pores can be frozen up to a depth of several meters. In another example, thermal treatment becomes possible. In this method, hydrocarbons may be rendered volatile. The process is well suited for neutralizing heavy metals if such are present in the contamination. In this case, material can be injected into the subsoil resulting in the water insolubility of heavy metals.

In addition to the accessory advantages of the process according to the invention, the main advantage lies in that it can be used in places where performance of traditional technologies is impossible, for example, soil contamination in subsoil occurring under plants, factories, lakes and rivers or between densely arranged objects. The process according to the invention can be combined with traditional technologies operating with vertical bores. This will increase the versatility of the process according to the invention and the adaptability of the process to different conditions.

REFERENCE NUMBERS

| | |
|---|---|
| 1 | contaminated layer |
| 2 | impermeable layer |
| 3 | coverlayer |
| 4 | connecting pipe |
| 5 | connecting pipe |
| 4,6a | pipe-section |
| 5,6b | pipe-section |
| 6a,6b | perforated pipes |
| 7 | pump |
| 8 | tank |
| 9 | reactor |
| 10 | observing well |
| 11 | observing organ |
| 12a,12b | for-part of the pipe-section |
| 13a,13b | end-part of the pipe-section |

We claim:

1. A process for treating contaminated soil in-situ without demolishing the contaminated soil or structures situated above the contaminated soil comprising:
   a. using a pipe system comprising at least two branches; a first branch comprising a first oblique angled connecting pipe connected to a first perforated pipe positioned in a first oriented drilled boring in a direction in compliance with dominant position of a layer of contaminated soil; the boring in which said first connecting pipe and first perforated pipe are situated is drilled without any breaking-point from a first location on the earth's surface to a second location on the earth's surface; a second branch comprising a second oblique angled connecting pipe connected to a second perforated pipe positioned in a second oriented drilled boring in a direction in compliance with dominant position of the layer of contaminated soil; the second boring in which the second connecting pipe and the second perforated pipe situated is drilled without any breaking-point from a third location on the earth's surface to a fourth location on the earth's surface;
   b. introducing into said first branch a medium for treating the contaminated soil layer, said medium reaching the contaminated soil layer through the perforated pipe connected to the oblique angled connecting pipe; and
   c. bringing to the earth' surface through the second branch contaminated liquid or contaminated soft-water drained off from the second perforated pipe through the oblique angled connecting pipe.

2. The process according to claim 1 wherein the contaminated liquid or contaminated soil-water brought to the surface is cleaned and introduced with the medium into the first branch of the pipe system.

3. The process according to claim 1, wherein the contaminated liquid or contaminated soil-water brought to the surface is cleaned and introduced into the first branch of the pipe system.

4. The process as claimed in claim 1 where-in the contaminated liquid or soil-water having been delivered to the surface will be analyzed continuously or discontinuously.

5. The process as claimed in claim 1 wherein the contaminated soil layer is monitored independently of the pipe system by means of an observing well.

6. The process as claimed claim 1 wherein the contaminated layer will be examined by means of a carotage cable installed in a part of the pipe system and connected to a surfacial measuring unit, sensing organ measuring element or combination thereof.

7. The process as claimed claim 1 wherein after the contaminated soil layer is treated the layer is monitored.

8. The process as claimed in claim 1 wherein the medium comprises bacterial cultures or chemical agents.

9. The process according to claim 1 wherein the perforated pipes are positioned in a substantially horizontal direction in compliance with the dominant position of a layer of contaminated soil.

* * * * *